United States Patent [19]

Akagane et al.

[11] 4,108,924

[45] Aug. 22, 1978

[54] STABILIZED CHLORINE-CONTAINING RESIN COMPOSITION

[75] Inventors: Katsuo Akagane, Ashiya; Teruho Adachi; Kunimasa Kamio, both of Toyonaka, all of Japan

[73] Assignee: Sumitomo Chemical Company, Limited, Osaka, Japan

[21] Appl. No.: 661,553

[22] Filed: Feb. 25, 1976

[30] Foreign Application Priority Data

Feb. 26, 1975 [JP] Japan ................................. 50-24334

[51] Int. Cl.$^2$ .............................................. C08K 5/15
[52] U.S. Cl. .................. 260/837 PV; 260/23 XA; 260/45.8 A; 528/135
[58] Field of Search ........ 260/23 XA, 45.8 A, 59 EP, 260/837 PV

[56] References Cited

U.S. PATENT DOCUMENTS

| | | | |
|---|---|---|---|
| 2,530,353 | 11/1950 | Havens | 260/45.8 A |
| 2,564,194 | 8/1951 | De Nie | 260/45.8 A |
| 2,585,506 | 2/1952 | Shokal et al. | 260/45.8 A |
| 2,590,059 | 3/1952 | Winkler | 260/45.8 A |
| 2,671,064 | 3/1954 | Cowell et al. | 260/45.8 A |
| 2,989,497 | 6/1961 | Lycette | 260/45.8 A |
| 3,214,409 | 10/1965 | Peerman | 260/59 EP |
| 4,014,956 | 3/1977 | Smith et al. | 260/837 PV |
| 4,020,030 | 4/1977 | Harris et al. | 260/59 EP |

*Primary Examiner*—Donald E. Czaja
*Assistant Examiner*—R. A. White
*Attorney, Agent, or Firm*—Wenderoth, Lind, et al

[57] ABSTRACT

A chlorine-containing resin is prevented from degradation due to heat and light by addition of a novolac type epoxy compound of the formula,

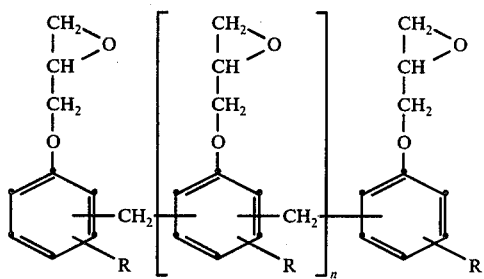

wherein R is hydrogen or $C_1 - C_4$ alkyl, and $n$ is a number of 5 to 15.

6 Claims, No Drawings

STABILIZED CHLORINE-CONTAINING RESIN COMPOSITION

The present invention relates to a chlorine-containing resin composition which is superior in stability, particularly in thermal stability.

Epoxy compounds such as epoxidized soybean oils, epoxidized linseed oils or glycidyl ether resins resulting from bisphenol A and epichlorohydrin are known as stabilizers for chlorine-containing resins such as polyvinyl chloride resins. When the epoxy type stabilizers are incorporated in the resins, they cause the softening temperature of the resins to drop so remarkably tht they are widely used for preparing plasticized polyvinyl chloride resin compositions, as a plasticizer which gives a stabilizing effect. However, in the case of rigid chlorine-containing resin compositions, the amount of the stabilizers incorporated in the resin is limited because of such a reduction of the softening temperature, and therefore a sufficient stabilizing effect can not be obtained. Further, almost all of the epoxy type stabilizers are viscous liquids at room temperature, and therefore they cause a problem in terms of the workability of weighing and pre-mixing operations on compounding. Some solid epoxy resins of a bisphenol A-epichlorohydrin type can be used as a stabilizer for rigid polyvinyl chloride resins because the reduction of the softening temperature of the resins is relatively small. However, since the said epoxy resins have a large epoxy equivalent (molecular weight of the resin per number of epoxy groups), they are inferior in the effectiveness as a stabilizer to the liquid epoxy compounds having a small epoxy equivalent.

As a result of extensive study to find a solid stabilizer which is operationally advantageous and also is effective for rigid chlorine-containing resins, it has been found that the resins can be remarkably stabilized with a particular novolac type epoxy compound.

The present invention provides a chlorine-containing resin composition, which comprises a chlorine-containing polymer and a novolac type epoxy compound of the formula,

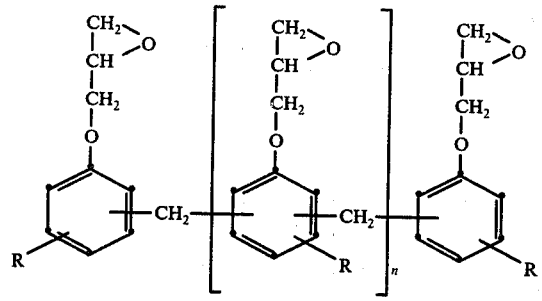

wherein R is a hydrogen atom or a $C_1 - C_4$ alkyl group (the position of the alkyl group being o- or p-position with respect to the epoxy group) and $n$ is a number from 5 to 15, the weight ratio of the epoxy compounds to 100 parts by weight of the resin being 0.03 to 10 parts by weight.

The novolac type epoxy compounds according to the present invention have a small epoxy equivalent and therefore, when incorporated in the rigid chlorine-containing polymers, they exhibit an excellent stabilizing effect against heat and light, and moreover they cause substantially no reduction of the softening temperature of the polymers.

The said epoxy compounds are solid at room temperature and can be obtained as a powder or flakes so that they are very useful for the improvement of the workability of weighing and pre-mixing operations on compounding. Furthermore, their blooming from chlorine-containing resin compositions, which frequently becomes a problem in the case of liquid epoxy compounds, is very minimal and therefore tackiness does not appear on the resin surface.

The novolac type epoxy compounds of the present invention can be obtained according to the well-known methods, for example by reacting epihalohydrin and a novolac resin, resulting from the condensation between phenols and formaldehyde in the presence of an acid catalyst, followed by treatment with sodium hydroxide or the like.

The phenols include a compound of the formula,

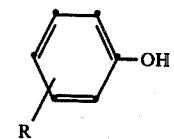

wherein R is as defined above, provided that the alkyl group is in the o- or p-position with respect to the hydroxy group when R is the alkyl group, for example phenol, o-cresol, p-cresol, o- or p-isopropylphenol, p-tert-butylphenol or the like. Of these, the most favorable is o-cresol.

The novolac resins obtained by the condensation of the phenols with formaldehyde are represented by the following formula,

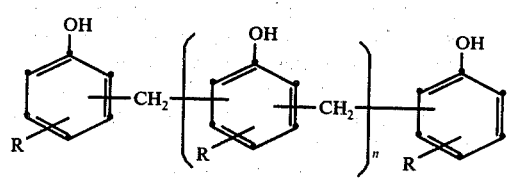

wherein $n$ and R are as defined above, and the molecular weight of the resins can optionally be varied depending upon the proportion of the phenols to formaldehyde. The preferred novolac resins of the present invention are those in which $n$ is from 8 to 12 in the above formula.

By the reaction of the above novolac resins with an epihalohydrin, for example epichlorohydrin or epibromohydrin, in the presence of sodium hydroxide or the like, the objective novolac type epoxy compounds can be obtained. The characteristic of these novolac type epoxy compounds consists in that the molecular weight, that is, the softening temperature of the compounds, can optionally be varied, with little or no change of epoxy group content, by controlling the molecular weight of the novolac resins used as a starting material. In this way, there can easily be synthesized the desirable epoxy compounds which have a high softening temperature and a large epoxy group content, in other words, which have a low epoxy equivalent.

On the other hand, the conventional epoxy compounds resulting from bisphenol A and epichlorohydrin have the following formula,

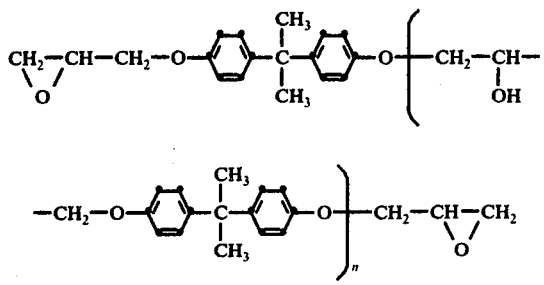

In the formula, the number of epoxy groups per molecule is limited to 2 and therefore the epoxy group content becomes lower as the molecular weight of the above epoxy compound is raised in order to raise the softening temperature. As the result, the epoxy equivalent of the resins having a softening temperature of about 70° C., which can effectively be used as a stabilizer for rigid polyvinyl chloride resins, becomes as large as about 500 and thus the epoxy resins become less effective as a stabilizer. While, according to the present invention, the novolac type epoxy compounds having both a softening temperature of about 70° C. and an epoxy equivalent of about 200, can easily be obtained, although these values vary to some degree depending upon the phenols used as a starting material. Furthermore, it is also possible to increase the softening temperature with no change in epoxy equivalent, thereby avoiding substantial reduction of the softening temperature of rigid polyvinyl chloride resins.

The chlorine-containing resins referred to herein include homopolymers of vinyl chloride or vinylidene chloride, copolymers between vinyl chloride or vinylidene chloride as a main component and other copolymerized monomers such as ethylene, propylene, acrylonitrile, styrene, vinyl ester, vinyl ether, vinylidene halide, methyl methacrylate, dialkyl fumurate, dialkyl malate and the like, after-chlorinated polymers, and polymers obtained by grafting chlorine-containing monomers on a spine polymer such as ethylene-vinyl acetate polymers and ethylene-alkyl acrylate polymers.

The compositions of the present invention contain as a main component a mixture of the novolac type epoxy compounds and chlorine-containing resins. The mixing ratio of the said epoxy resin to 100 parts by weight of the chlorine-containing resins is usually 0.03 to 10 parts by weight, preferably 0.1 to 5 parts by weight. When the amount of the epoxy resins is less than 0.03 part by weight, a sufficient thermal stability can not be obtained, while the amount of more than 10 parts by weight can be used without any problem but is not practical. In the preparation of the present compositions, the epoxy resins of preferably 60 mesh or less are merely mixed with the chlorine-containing resin, and, if desired, the resulting mixture can be subjected to a melt-blending.

In the present invention, a synergistic effect can be expected by further incorporating conventional stabilizers in the composition. The conventional stabilizers include for example metal soaps resulting from stearic acid or naphthenic acid and lead, cadmium, barium, zinc or calcium, mineral salt type stabilizers such as tribasic lead sulfate, dibasic lead phosphate, lead orthosilicate, and lead carbonate, organo-tin type stabilizers and the above well-known epoxy type stabilizers. Further, in the compositions of the present invention, processing agents conventionally used by the skilled in the art, for example, antioxidants, ultraviolet ray absorbers, coloring agents, plasticizers and fillers, may suitably be used.

The present invention will be illustrated in greater details with reference to the following examples, which are not however to be interpreted as limiting the invention thereto. All parts in the examples are by weight.

REFERENCE EXAMPLE

To a flask were charged 400 parts of epichlorohydrin and 75 parts of the novolac resin (number average molecular weight 860, softening temperature 110° C.) resulting from o-cresol and formaldehyde. The mixture was heated to 100° C. and 56 parts of a 48% aqueous sodium hydroxide solution was added dropwise over 2 hours. During this period, the azeotropic mixture of water and epichlorohydrin which was distilled out was separated into water and epichlorohydrin, the latter being returned to the reaction system. After completion of the reaction, an excess of epichlorohydrin was removed by distillation and the resulting resin was dissolved in 300 parts of toluene. The solution was filtered to remove produced sodium chloride and the filtrate was concentrated to obtain a pale yellow, solid novolac type epoxy compound (epoxy equivalent 220, softening temperature 92° C.).

EXAMPLE 1

Using the epoxy compound obtained in Reference Example and epoxy compounds as a reference, the compounds having the compositions as described in Table 1 were prepared. Each compound was kneaded on a roller at 170° C. for 5 minutes and formed into a sheet. The sheet was pre-heated at 170° C. for 5 minutes and pressed for 5 minutes into a test piece of 0.5 mm thickness. Using the test piece, the thermal stability test, Vicat softening temperature measurement and bleeding test were carried out.

In the thermal stability test, the test piece was aged in a Geer oven maintained at 200° C. and the time required for the test piece to become black was measured. In the bleeding test, the test piece of 0.5 mm thickness was cut into a piece of 10 cm × 10 cm in size, which was dipped in distilled water in a beaker for one day, taken out on a black sheet and observed.

The test results are as shown in Table 1. In Experiment Nos. 1, 2 and 3 with the present epoxy compound, as apparent from the table, the thermal stability obtained is much superior to that in Experiment No. 8 with no present epoxy compound, and further no reduction of the softening temperature is observed at all as compared with Experiment Nos. 4, 5, 6 and 7 with commercially available epoxy compounds as a reference.

On the other hand, the compound of the present invention is superior to the bisphenol A-epichlorohydrin type solid epoxy resins (Experiment Nos. 4 and 5) in the following points. The present compound gives a better thermal stability, gives the stabilizing effect with less amount used and causes no reduction of the softening temperature. Furthermore, the present compound shows no bleeding, as apparent from Experiment Nos. 1, 2 and 3, unlike Experiment Nos. 6 and 7 with the reference compound.

Table 1

| Experiment No. | Present invention | | | Reference | | | | |
|---|---|---|---|---|---|---|---|---|
| | 1 | 2 | 3 | 4 | 5 | 6 | 7 | 8 |
| Composition | (parts) | (parts) | (parts) | (parts) | (parts) | (parts) | (parts) | (parts) |
| polyvinyl chloride resin *1 | 100 | 100 | 100 | 100 | 100 | 100 | 100 | 100 |
| epoxy compound A *2 | 0.3 | 0.5 | 2 | — | — | — | — | — |
| epoxy compound B *3 | — | — | — | 1 | 3 | — | — | — |
| epoxidized soybean oil *4 | — | — | — | — | — | 1 | 4 | — |
| Ca/Zn type stabilizer *5 | 0.5 | 0.5 | 0.5 | 0.5 | 0.5 | 0.5 | 0.5 | 0.5 |
| tribasic lead sulfate | 3 | 3 | 3 | 3 | 3 | 3 | 3 | 3 |
| Test Results | | | | | | | | |
| vicat softening temperature (° C) | 95.0 | 98.8 | 94.9 | 93.0 | 92.3 | 90.6 | 89.0 | 94.3 |
| thermal stability [time required for blackening (min.)] | 60 | 60 | >60 | 40 | 45 | 30 | 35 | 30 |
| bleeding test | no bleeding | no bleeding | no bleeding | no bleeding | no bleeding | bleeding | bleeding | no bleeding |

*1 Sumilit SX-8 (a registered trade mark of polyvinyl chloride resin produced by Sumitomo Chemical Company, Limited).
*2 The novolac type epoxy resin obtained by Reference Example.
*3 Bisphenol A-epichlorohydrin type solid resin (Sumi$^R$-epoxy ESA-Oll, a registered trade mark of said resin produced by Sumitomo Chemical Company, Limited).
*4 Adekacizer-O-130P (a registered trade mark of a stabilizer produced by Adeka Argus Co., Ltd.).
*5 Mark 577 (a registered trade mark of a stabilizer produced by Adeka Argus Co., Ltd.).

EXAMPLE 2

Example 1 was repeated, provided that the compositions were as shown in Table 2, and the test results are also shown in the Table 2.

Table 2

| Experiment No. | Present invention | | | Reference | | | |
|---|---|---|---|---|---|---|---|
| | 9 | 10 | 11 | 12 | 13 | 14 | 15 |
| Composition | (parts) | (parts) | (parts) | (parts) | (parts) | (parts) | (parts) |
| polyvinyl chloride resin *1 | 100 | 100 | 100 | A | 100 | 100 | 100 |
| epoxy compound A/ *2 | 0.5 | 0.5 | — | — | — | — | 0.3 |
| epoxy compound B | — | — | — | 0.5 | — | — | — |
| epoxidized soybean Oil *4 | — | — | — | — | 0.5 | — | — |
| Ca/Zn type stabilizer *5 | 0.5 | 0.5 | — | 0.5 | 0.5 | 0.5 | — |
| Sn type stabiizer *6 | 0.5 | 0.5 | — | 0.5 | 0.5 | 0.5 | — |
| Sn type stabilizer *7 | 2.5 | 2.5 | — | 2.5 | 2.5 | 2.5 | — |
| Test Results | | | | | | | |
| vicat softening temperature (° C.) | 96.0 | 95.5 | 95 | 93.0 | 92.0 | 95.0 | 93.5 |
| thermal stability [time required for blackening (min.)] | 60 | 60 | 25 | 45 | 35 | 30 | 15 |
| bleeding test | no bleeding | no bleeding | no bleeding | no bleeding | bleeding | no bleeding | no bleeding |

*1 to *5 The same as in Example 1.
*6 A stabilizer of dioctyl tin maleate (KS-1010A, a trade mark of Kyodo Chemical Co., Ltd.).
*7 Sulfur-containing dioctyl tin type stabilizer (KS-2000F, a trade mark of Kyodo Chemica Co., Ltd.).

What we claim is:

1. A composition comprising
   A. a rigid chlorine-containing polymer selected from the group consisting of (1) a homopolymer of vinyl chloride, (2) a homopolymer of vinylidene chloride, (3) a copolymer of vinyl chloride or vinylidene chloride with ethylene, propylene, acrylonitrile, styrene, a vinyl ester, a vinyl ether, a vinylidene halide, methyl methacrylate, a dialkyl fumarate or a dialkyl maleate, and (4) an ethylene-vinyl acetate polymer or ethylene-alkyl acrylate polymer having vinyl chloride or vinylidene chloride grafted thereon, and
   B. a novolac type epoxy compound of the formula

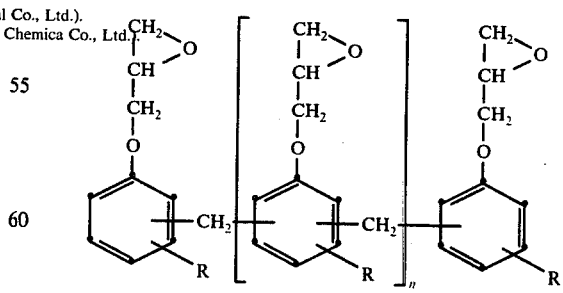

wherein R is hydrogen or a $C_1 - C_4$ alkyl group in the position ortho or para to the epoxy group, and $n$ is a number of from 5 to 15, the weight ratio of the epoxy compound to 100 parts by weight of the chlorine-containing polymer being 0.03 to 10 parts by weight.

2. The composition of claim 1 in the form of a molded article.

3. The composition according to claim 1, wherein the chlorine-containing polymer is a vinyl chloride homopolymer.

4. The composition according to claim 1, wherein $n$ is a number of from 8 to 12.

5. The composition according to claim 1, wherein the novolac type epoxy compound is prepared by reacting an epihalohydrin with a novolac resin obtained by the reaction of a phenol compound of the formula,

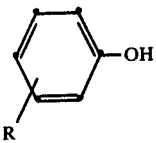

wherein R is as defined in claim 8, with formaldehyde in the presence of an acid catalyst.

6. The composition according to claim 5, wherein the phenol compound is o-cresol.